March 15, 1932.   J. WILLIAMS   1,849,562
REMOTE CONTROL ATTACHMENT FOR TRACTORS
Filed Oct. 19, 1929
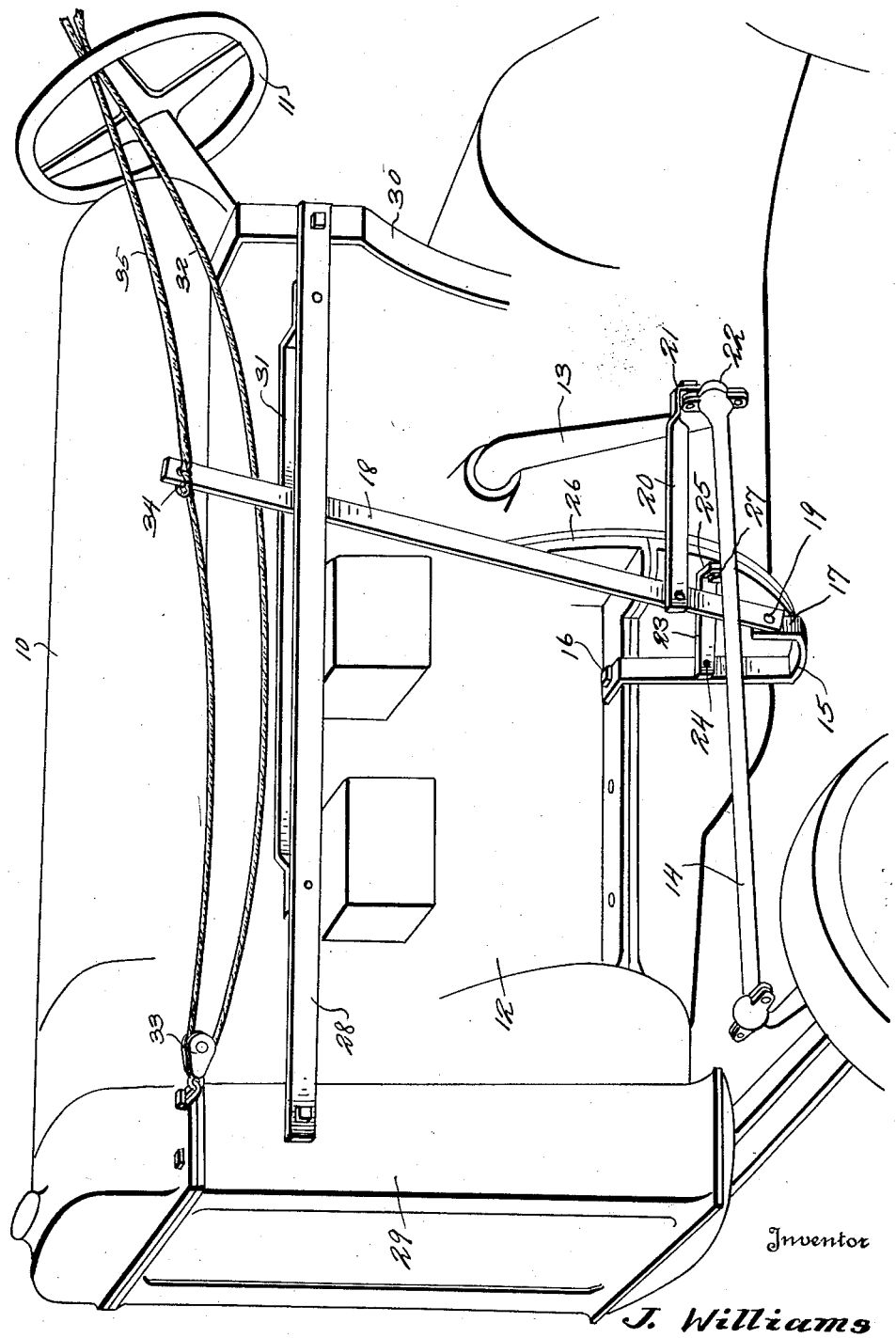
Inventor
J. Williams
By Watson E. Coleman
Attorney Patented Mar. 15, 1932

1,849,562

UNITED STATES PATENT OFFICE

JESSE WILLIAMS, OF CHARLES CITY, IOWA

REMOTE CONTROL ATTACHMENT FOR TRACTORS

Application filed October 19, 1929. Serial No. 400,941.

The present invention relates to attachments for steering devices and more particularly to attachments for use in steering apparatus for tractors or the like.

An object of the present invention is to provide a device of this character whereby the operator of the tractor may control the movement of the tractor from a position remote from the tractor.

Another object of this invention is to provide a device of this character which may be readily and easily attached to the present steering control of the tractor without any changes being made.

A still further object of this invention is to provide a device of this character which, when mounted upon the tractor will not in any way interfere with the present steering structure.

The above and other objects and advantages of this invention will in part be described and in part be understood from the following detailed description of the present preferred embodiment, the same being illustrated in the accompanying drawing wherein there is shown a fragmentary perspective view of a tractor having a remote steering control device constructed according to the present invention mounted thereon.

Referring to the drawing 10 designates generally a tractor of any suitable construction having a steering wheel 11 mounted rearwardly of the engine portion 12. The steering wheel 11 is connected in any suitable manner to a steering arm 13 which depends outwardly of the tractor and is connected by a pitman 14.

A supporting member 15 which in the present preferred embodiment is constructed substantially J-shaped and having an inwardly extending flange 16 is adapted to be mounted on the engine 12 and may be secured through one of the bolts holding the crank case to the cylinder or body portion of the engine. The outer portion of the supporting member 15 is bent upwardly as at 17, and an upwardly extending lever 18 is pivotally mounted adjacent its lower end on the upwardly extending portion 17 of the supporting member 15. A bolt 19, or the like may be used as a pivot extending through the adjacent lower end of the arm or lever 18, and through a suitable opening in the supporting member 15.

A link or the like 20 is pivotally mounted at its forward end on the lever 18 at a point spaced upwardly from the lower end thereof. The link 20 preferably extends rearwardly from the lever 18 in substantially horizontal position and may be constructed of a flat bar of metal or the like, having a downwardly extending rear apertured flange 21 which is adapted to be mounted on the rear portion 22 of the pitman 14. A supporting brace 23 is mounted on the inner portion of the supporting member 15 spaced inwardly from the opposite ends thereof and may be secured to the support 15 by a bolt or rivet 24 or the like.

The brace 23 may be constructed of a flat bar of metal or the like, having an outwardly extending rear portion 25 which engages the forward end of the fly-wheel housing 26 of the engine 12. The flange 25 is provided with an aperture for receiving one of the bolts 27 holding the fly-wheel casing 26 together so as to provide a rigid supporting member 15. A longitudinally extending bar 28 is mounted on the tractor adjacent the upper end, but in the present case the forward end of the bar 28 may be bolted or otherwise secured to the radiator shell 29 and at its rear end on the dashboard framework 30. The lever 18 is adapted to be slidably mounted between the bar 28 and the engine 12. A guide 31 is mounted on the supporting bar 28 in spaced relation thereto and spaced inwardly from the opposite ends thereof. The lever arm 18 is adapted to be mounted between the supporting bar 28 and the guide 31 for movement therebetween.

A rope or other flexible member 32 is slidably mounted in a pulley 33 which, in the present instance, is secured at the forward end of the tractor at any suitable point, but in the present instance is mounted on one of the bolts of the upper portion of the radiator shell. The steering control rope 32 is secured at one side to the upper portion of the lever 18 as at 34, in any suitable manner so as to prevent movement of the rope with relation to the lever 18. The rear end of the rope 32 may be positioned at any convenient location, whereby the operator of the tractor may have free use of the ends thereof. In operation, the operator of the device may pull the strand 35 of the rope 32 which is secured to the upper portion of the lever 18, thereby pulling the lever rearwardly and coactively moving the pitman or drag link 14 rearwardly so as to turn the steering arms on their pivots.

It will, of course, be understood that various changes and modifications may be made in the details of construction of the present preferred embodiment of the invention without departing from the spirit thereof, such changes and modifications being restricted only by the scope of the following claim.

What is claimed is:—

In combination with a tractor, a remote control steering attachment for said tractor, comprising a supporting member mounted on the frame of the tractor, brace means for said supporting member, operating means pivotally mounted on said supporting member and upstanding therefrom, a link pivotally mounted at its forward end on the operating means, said link having a downwardly extending apertured flange at the rear end thereof, said flange engaging the steering gear arm of the tractor, guide means for said operating means, said guide means comprising a pair of elongated bars disposed on opposite sides of said operating means and remote control means for rocking said operating means.

In testimony whereof I hereunto affix my signature.

JESSE WILLIAMS.